United States Patent [19]

Heinrich et al.

[11] Patent Number: 4,606,947

[45] Date of Patent: Aug. 19, 1986

[54] LACQUER FOR COATINGS PROTECTING AGAINST STONE CHIPPING, A PROCESS FOR ITS PREPARATION AND ITS USE

[75] Inventors: Siegfried Heinrich; Rudolf Heitzmann; Ahmed Shafik, all of Wuppertal, Fed. Rep. of Germany

[73] Assignee: Herberts GmbH, Fed. Rep. of Germany

[21] Appl. No.: 657,757

[22] Filed: Oct. 4, 1984

[30] Foreign Application Priority Data

Oct. 14, 1983 [DE] Fed. Rep. of Germany ....... 3337394

[51] Int. Cl.$^4$ .................... B05D 3/02; B32B 27/00; C08G 18/80
[52] U.S. Cl. .................. 427/388.1; 428/336; 428/423.1; 428/425.8; 525/124; 525/403; 525/440; 528/45
[58] Field of Search ............... 528/45; 525/124, 403, 525/440; 427/388.1; 428/336, 423.1, 425.8

[56] References Cited

U.S. PATENT DOCUMENTS

| | | |
|---|---|---|
| 3,023,126 | 2/1962 | Underwood et al. ............... 117/76 |
| 3,198,692 | 8/1965 | Bridgeford ........................ 161/188 |
| 3,658,761 | 4/1972 | Hostettler et al. ................ 260/77.5 |
| 3,726,825 | 4/1973 | Woodward et al. ........ 260/29.2 TN |
| 4,021,405 | 5/1977 | Tucker et al. ................. 260/45.8 R |
| 4,072,770 | 2/1978 | Ting ...................................... 427/54 |
| 4,073,975 | 2/1978 | Buckwalter et al. ............... 427/170 |
| 4,101,497 | 7/1978 | Charves et al. ............... 260/31.2 N |
| 4,101,530 | 7/1978 | Burkhardt et al. .................. 528/45 |
| 4,163,814 | 8/1979 | Asai et al. ........................... 427/372 |
| 4,197,344 | 4/1980 | Tshudy ................................ 428/212 |
| 4,280,944 | 7/1981 | Saito et al. .......................... 528/45 |
| 4,299,868 | 11/1981 | Berndt ............................... 427/389.9 |
| 4,306,051 | 12/1981 | Gras et al. ............................ 528/45 |
| 4,313,876 | 2/1982 | Gras et al. ............................ 528/45 |
| 4,332,965 | 6/1982 | Dalibor ................................ 528/45 |
| 4,346,144 | 8/1982 | Craven .............................. 525/124 |
| 4,364,980 | 12/1982 | Mass et al. .......................... 428/35 |
| 4,375,539 | 3/1983 | McBride et al. ..................... 528/45 |
| 4,382,114 | 5/1983 | Höhlein et al. .................... 428/423 |
| 4,395,529 | 7/1983 | Panandiker et al. ................ 528/45 |
| 4,442,145 | 4/1984 | Probst et al. ...................... 525/124 |

FOREIGN PATENT DOCUMENTS

| | | |
|---|---|---|
| 2639491 | 2/1978 | Fed. Rep. of Germany . |
| 3140834 | 6/1982 | Fed. Rep. of Germany . |
| 3137133 | 4/1983 | Fed. Rep. of Germany . |
| 1573631 | 8/1980 | United Kingdom . |

OTHER PUBLICATIONS

One page of German search report on which the art is cited re Patentanmeldung P 33 37 394.9.

Primary Examiner—Herbert S. Cockeram
Attorney, Agent, or Firm—Mandeville & Schweitzer

[57] ABSTRACT

Lacquer for coatings protecting against stone chipping, containing pigments, fillers, binders consisting of a mixture of film forming, hydroxyl-containing polyesters and aliphatic and/or cycloaliphatic polyisocyanates which are blocked with acetoacetic acid alkyl esters and have an average functionality of at least 2.5, organic solvents and conventional lacquer additives, which lacquer contains certain polyesters having an average hydroxyl functionality of from 2.5 to 6 and a hydroxyl content of from 2 to 6% by weight and containing from 15 to 50% by weight (aliphatic content) of aliphatic groups which have at least 4 to 20 carbon atoms in an unbranched chain, the proportion by weight of this aliphatic group content in the polyester to the benzene ring content in the polyester, calculated as the sum of the weight of carbon atoms of the benzene rings and of the hydrogen atoms attached to these carbon atoms (aromatic content) is from 1 to 2.5, and a process for its preparation and its use.

14 Claims, No Drawings

LACQUER FOR COATINGS PROTECTING AGAINST STONE CHIPPING, A PROCESS FOR ITS PREPARATION AND ITS USE

This invention relates to a lacquer protecting against stone chipping, containing pigments, fillers, binders consisting of a mixture of film forming, hydroxyl-containing polyesters and aliphatic and/or cycloaliphatic polyisocyanates which are blocked with aceto acetic acid alkyl esters and have an average functionality of at least 2.5 and in which the alkyl groups are methyl, ethyl, n-propyl, i-propyl, n-butyl, i-butyl or secondary butyl groups, organic solvents and the usual lacquer additives. The invention also relates to a process for its preparation and to its use.

In the formation of multilayered lacquers on the upper parts of car bodies, the application of a sufficiently protective layer against stone chipping and/or filler layer is becoming increasingly important because the front parts of the car bodies are being made less steep for aerodynamic reasons so that larger areas of the car body are exposed to stone chipping when the vehicle is in motion. Furthermore, when roads are iced up in winter, it is becoming increasingly customary to cover them with grit rather than salt. The layers protecting against stone chipping and/or filler layers are arranged between the usual primer coat and the coloured top coat lacquer which may consist of several layers.

The layer protecting against stone chipping is basically a layer of lacquer applied in addition to the usual build up of car paint work (primer/top lacquer). It may be applied as a thick layer, as in No. EP-A-59962, or as a thin layer.

Coatings protecting against stone chipping which are applied as thick layers differ in the chemistry of their binders (in most cases amine cross linking, blocked isocyanates containing polyethers) from thin layered coatings protecting against stone chipping (OH-functional copolymers, e.g. polyesters, etc., cross linked through blocked polyisocyanates). Whereas the thick layered systems give rise to rubbery elastic films, the thin layered systems are considerably harder but are still tough-elastic in character compared with conventional lacquer coatings and therefore cannot be sanded down.

If the thick layered systems are applied as thin layers, they provide virtually no protection against stone chipping owing to their very soft structure. If thin layered systems are applied as thick layers, the coatings obtained, being harder, are not rubbery elastic but the films do have defects such as pitting, blisters, etc.

Both types of stone chipping protective layers are normally covered (in most cases wet in wet) with a filler so that smooth surfaces which can be sanded down are obtained.

Fillers belong to the state of the art of lacquering carried out as part of the mass production of motor vehicles and should provide smooth surfaces by filling up any irregularities of the surface to which they are applied (high filler content). In addition, fillers must give rise to hard films so that they can be sanded down with 400–600 grade paper without the paper becoming clogged up with wet sanding dust. The fillers known in the art contain, as binders, alkyd (polyester) resins, amine resins and possibly epoxide resins. The lacquer films obtained with such binders are hard but not very flexible so that they provide only limited protection against stone chipping. There is therefore a demand in the motor car industry for an additional protective layer against stone chipping, the consistency required for sanding down the surface being obtained by means of the filler above it.

One disadvantage of this arrangement is that it requires the application of an additional layer of lacquer (increased material costs, additional working step). The ideal would be a lacquer layer which combines satisfactory protection against stone chipping with good filler characteristics (smooth surface, ability to be sanded down, etc), so that the conventional filler may be dispensed with.

No. DE-A-31 40 834 discloses a multilayered lacquering in which an intermediate layer based on a solution in organic solvents or water of an addition product of maleic acid anhydride and diene polymers optionally modified by partial esterification with monohydric alcohols and/or unsaturated hydrocarbon resins and/or hydrolysed is applied between the primer and the top lacquer. Such binders, however, require high stoving temperatures of about 180°–200° C. for at least about 15 minutes. There is a great demand for lower stoving temperatures, if possible below 140° C.

A protective layer against stone chipping for motor vehicles is known from EP-A No. 59 962, in which the binder is a storage stable mixture of certain amines with a prepolymer having an average molecular weight of from 500 to 15,000 containing an average of 2 to 6 ketoxime-blocked NCO groups which are attached to the prepolymer by cycloaliphatic and/or aliphatic groups.

Similar binder formulations are described in Nos. DE-A-2,131,299 and DE-A-3,108,861. These binders give rise to excellent stone chipping protective layers but the amines used in them are undesirable for reasons of industrial hygiene.

It is an object of the present invention to provide a lacquer which is suitable for layers protecting against stone chipping, which can be stoved at low stoving temperatures of, say, 120° C., and which has good storage stability even at temperatures above 25° C. In addition, this lacquer should be able to be applied in thin layers of less than 50 μm which should nevertheless form a film which is highly resistant to stone chipping. The invention is also based on the object of providing a process for the preparation of a lacquer for layers protecting against stone chipping, according to which there may also be used pigments which are difficult to disperse.

It has now been found that this problem may be solved surprisingly simply by using, as binder for the lacquer which is to form the protective layer against stone chipping, a storage stable mixture of certain film forming, hydroxyl-containing polyesters with certain blocked isocyanates.

The present invention thus relates to a lacquer for protective layers against stone chipping, containing pigments, fillers, binders consisting of a mixture of film forming, hydroxyl-containing polyesters and aliphatic and/or cycloaliphatic polyisocyanates having an average functionality of at least 2.5 blocked with acetoacetic acid alkyl esters in which the alkyl groups are methyl, ethyl, n-propyl, i-propyl, n-butyl, i-butyl or sec.-butyl groups, organic solvents and the usual lacquer additives, characterised in that the hydroxyl-containing polyesters contained in it are branched chain polyesters obtainable from benzene carboxylic acids and aliphatic and/or cycloaliphatic dicarboxylic acids, optionally mixed with monocarboxylic acids, and aliphatic and/or cycloaliphatic polyols having 2 to 4 hydroxyl groups per molecule, the polyester having an average hydroxyl funtionality of 2.5 to 6 and a hydroxyl content of 2 to 6% by weight and containing from 15 to 50% by weight (aliphatic content) of aliphatic groups which have at least 4 to 20 carbon atoms in an unbranched chain, the proportion by weight of these aliphatic groups present in the polyester to the benzene rings present in the polyester, calculated as sum of the weight of the carbon atoms of the benzene rings and of the hydrogen atoms attached to these carbon atoms (aromatic content), being in the range of 1 to 2.5.

The invention further relates to a process for the preparation of this lacquer for layers protecting against stone chipping by the preparation of a dispersion of its components, such that, according to the invention, the pigments are dispersed in the film forming, hydroxyl-containing polyesters at temperatures higher than about 40° C., preferably higher than about 60° C., and the blocked polyisocyanates and optionally other additives are subsequently stirred in at temperatures lower than about 45° C.

The invention also relates to the use of the above defined lacquer for producing a protective layer against stone chipping having a dry film thickness of 15 to 50 μm, preferably on the car body parts of motor vehicles.

The lacquer forming a protective layer against stone chipping is generally applied to the upper parts of car bodies of motor vehicles after these have been primed in the usual manner, preferably with a so called EC primer (electro coating lacquering). It contains partially neutralised binders dispersed in water, prepared, for example, on the basis of natural or synthetic maleate oils, acid polyesters or acrylate resins or amino epoxide resins, as described, for example, in Nos. DE-A-2,737,174, DE-A-2,824,418, EP-A-04090 and DE-A-3,122,641, in combination with pigments and fillers.

When the work piece which is to be coated, e.g. a motor car body, is immersed in the aqueous dispersion and an electric voltage of 100 to 400 Volt is applied, the lacquer is deposited either at the anode or at the cathode, depending on the type of binder. The lacquer film thus applied is then stoved at temperatures, for example, of 160°–200° C. The primer may be applied in several layers. The layer of lacquer protecting against stone chipping according to this invention is then applied thereon.

The hydroxyl-containing polyesters used according to the invention are prepared in known manner by the polycondensation of acids with alcohols. The acids are the same as those used for the preparation of hydroxyl-containing polyesters used as binders in the motor car industry. The main components are benzene carboxylic acids used in admixture with aliphatic and/or cycloaliphatic dicarboxylic acids, optionally also in admixture with monocarboxylic acids. The benzene carboxylic acids used may be mono-, di- and optionally tri- and tetracarboxylic acids. Benzene dicarboxylic acids, i.e. phthalic acid and its isomers (isophthalic acid, terephthalic acid and their methyl esters and anhydrides) are preferred. Small quantities of trimellitic acid and/or pyromellitic acid may be used in addition. It is not advantageous to use large quantities of these acids because excessive cross linking then occurs. Moreover, these acids are relatively difficult to obtain and therefore expensive. Examples of suitable aromatic monocarboxylic acids are benzoic acid and p-tertiary-butyl benzoic acid.

Examples of aliphatic and cycloaliphatic dicarboxylic acids and their anhydrides include sebacic acid, azelaic acid, adipic acid, maleic acid, fumaric acid, itaconic acid, the isomers of tetra- and hexahydrophthalic acid, and dimeric and trimeric fatty acids.

Both aliphatic and aromatic monocarboxylic acids may be used. Particularly suitable monocarboxylic acids are, for example, pelargonic acid, isononanoic acid, 2-ethylhexanoic acid, coconut precursor fatty acid, natural acids occuring in the form of oils and fats, e.g. linseed oil fatty acid, soya bean oil fatty acid, castor oil fatty acid, coconut oil fatty acid and chemical derivatives of these acids, e.g. ricinene fatty acid. Instead of the fatty acids, the oils or fats may be used for the preparation of these special polyesters.

The alcohols used are also the same aliphatic and/or cycloaliphatic polyols with 2 to 4 hydroxyl groups per molecule as those used in this technical field. The following are examples: butanediol-(1,2), butanediol-(1,3), butanediol-(1,4), neopentylglycol, ethylene glycol, propanediol-(1,2), propanediol-(1,3), di- and triethylene glycol, polyethylene glycols with molecular weights of up to 2000, di- and tripropylene glycol derived from propane diol-(1,2), polypropylene glycols with molecular weights of up to 2000 derived from propanediol-(1,2), glycerol, trimethylol propane, hexanediol-(1,6), polycaprolactone polyols with molecular weights of up to 2000, pentaerythritol, dipentaerythritol, hydroxy pivalic acid neopentyl glycol ester, 2-ethyl hexane diol-(1,3), castor oil, trimethylol ethane, trimethyl pentane diol-(1,3), and fatty acid monoglycerides.

It is essential for the invention that the polyesters should have an average hydroxyl functionality of from 2.5 to 6. This means that each polyester molecule contains on statistical average 2.5–6 hydroxyl groups. Polyesters having such a hydroxyl functionality are obtained by suitable choice of the carboxylic acids and polyols and their functionality in a manner well known to the man of the art. The basic principles of the preparation and calculation of alkyd and polyester resins have been fully described in: T. C Patton, Alkyd Resin Technology, Interscience Publishers, 1962, New York—London.

Another essential requirement according to the invention is that the polyesters should have a hydroxyl content of from 2 to 6% by weight. This is initially determined as the hydroxyl number, as described in the German Standard of December 1971, DIN No. 53240. Division of the hydroxyl number by 33 gives the hydroxyl group content in percent by weight in the resin.

Another essential requirement is that the polyesters should contain from 15 to 50% by weight of aliphatic groups having at least 4 to 20 carbon atoms in an unbranched chain. This content is defined in the context of this invention as "aliphatic content". The aliphatic groups preferably contain 4 to 18, most preferably 4 to 12 carbon atoms in an unbranched chain. Calculation of the aliphatic content, however, is not based only on these unbranched chains but also on any alkyl groups present which are directly attached to this chain. For example, a polyester prepared from the following constituents:

146 g adipic acid,
148 g phthalic acid anhydride,
408 g pentaerythritol,
534 g p-tertiary-butylbenzoic acid, 432 g 2-ethyl hexanoic acid,
condensed to an acid number of less than 2, contains 23.4% by weight of aliphatic component and 20.2% by weight of aromatic component. The proportion by weight of aliphatic to aromatic content is 1.16%.

Another requirement is that the proportion by weight of aliphatic content to aromatic content in the polyester should be kept within a certain range, namely from 1 to 2.5, preferably from 1 to 2.3, most preferably from 1 to 2.1.

By aromatic content is meant in the context of this invention the weight of carbon atoms in the benzene rings and hydrogen atoms attached to these carbon atoms present in the polyester in the form of benzene rings.

The polyesters suitably have an arithmetic average molecular weight of from 500 to 10,000, preferably from 500 to 6,000, most preferably from 500 to 4,000.

These polyesters are used in admixture with the above defined blocked isocyanates. The blocked polyisocyanates used may be of the kind in which the isocyanate component is of an aliphatic and/or cycloaliphatic nature. Such blocked polyisocyanates are known in the art. Thus, for example, blocking of the compound

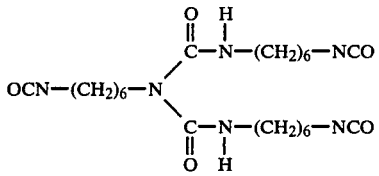

with an alkyl ester of acetoacetic acid is described in No. DE-A-2,612,783. Blocked polyisocyanates of the kind prepared as described in No. DE-A-2,550,156 are also suitable for the preparation of the lacquers according to the invention used as protective layers against stone chipping, provided that the blocking agents used are acetoacetic acid alkyl esters containing isocyanate-reactive methylene groups and the average functionality of the isocyanate compound used is at least 2.5.

The preparation of blocked polyisocyanates of the kind used for the preparation of the lacquers according to the invention for protection against stone chipping are also described in Nos. DE-A-2,623,081, DE-A-2,639,491 and DE-A-2,640,295. The blocked polyisocyanates prepared according to DE-A-3,001,060 may also be used, provided acetoacetic acid alkyl esters are used as blocking agent and the diisocyanate which is oligomerised by way of one or more than one isocyanurate ring is of an aliphatic and/or cycloaliphatic type.

Stone chipping protective layers containing these polyesters are particularly easily lacquered over with fillers. This may also be carried out wet-in-wet as known in this technical field. If the stone chipping protective layers which have filler characteristics and can be sanded down are to be directly covered with top coat lacquer, the polyesters used according to the invention should preferably have a hydroxyl functionality above 3.5, preferably above 4.5, and the proportion of aliphatic content to aromatic content should be less than 1.8, preferably below 1.5.

The quantitative proportion of polyester to blocked isocyanate should suitably be chosen to provide at least 0.5 equivalents and not more than 2 equivalents of blocked isocyanate groups for 1 equivalent of hydroxyl groups. 0.8 to 1.3 equivalents of blocked isocyanate groups in the isocyanate component per equivalent of hydroxyl groups of the polyester component are particularly preferred.

The organic solvents used may suitably be aromatic hydrocarbons such as xylene, Solvesso 100 (Esso) (register Trade Mark), glycol esters such as ethyl glycol acetate, esters such as butyl acetate, alcohols such as isopropanol, ethers such as ethylene glycol dimethyl ether or other solvents capable of dissolving the binders, and the solvent used may be either only one of the substances described or a mixture of these substances.

The lacquer according to the invention for the protective layer against stone chipping contains about 10 to 50 parts by weight of solvent, preferably about 15 to 35 parts by weight of solvent, to 100 parts by weight of binder, i.e. to the total quantity of polyester and blocked isocyanate.

In addition, the said protective lacquer contains the usual additives such as silicone oils or low molecular weight acrylic polymers (levelling agents), pigment wetting agents (soya lecithin), epoxide resins, plasticizers (Palatinol C, registered Trade Mark), fillers such as heavy spar, kaolin or talcum; thixotropic agents such as Aerosil, bentone (both registered Trade Marks); catalysts such as organic zinc compounds.

The lacquer also contains pigments to impart the desired colour shade or covering power. As mentioned above, those layers protecting against stone chipping which render an additional layer of filler superfluous and may be directly covered with the final lacquer coat of the motor vehicle are particularly desired. Since the top coat lacquer is easily damaged and removed by stone chipping, the protective layer should have the same pigmentation as the top coat lacquer or at least a similar shade, preferably containing coloured pigments for producing a yellow, red, green or blue shade corresponding to the desired colour shade. As is known, motor vehicles are frequently lacquered in luminous colours. The pigments used for such colours are in many cases difficult to disperse, i.e. temperatures of at least about 40° C. must be applied for long periods, e.g. for more than 20 or 30 minutes, for dispersing these pigments in the binder. This is not possible if the binder used consists of mixtures or preadducts of hydroxyl-containing polyesters and blocked polyisocyanates because these undergo partial reaction when subjected to the grinding and dispersion temperatures of above approximately 40° C. It has been found that this problem may be solved surprisingly easily if the lacquer according to the invention which is to provide a protective layer against stone chipping is prepared by dispersing the pigments in the film forming polyesters containing hydroxyl groups at temperatures above approximately 40° C., preferably above approximately 60° C., and the polyisocyanates are stirred in only thereafter, at temperatures below about 45° C. The process may very suitably be carried out with pigments which are extremely difficult to disperse, e.g. pigments which must be dispersed at temperatures above, say, 40° C. or even above approximately 60° C. Since the addition of polyisocyanates with stirring is completed within a short time, temperatures of up to about 50° C. may briefly be used for this purpose. What is important is that the finished lacquers should be cooled to room temperature as soon as possible, but they have an excellent stability in storage even at temperatures above 25° C. Over prolonged periods of several weeks or months, however, they should not be stored at temperatures above approximately 35° C. Tests have shown that the lacquers according to the invention may be stored for more than 3 weeks at a test temperature of 32° C. without any significant increase in viscosity being observed.

Dispersion of the pigments at elevated temperatures is necessary to ensure good levelling of the lacquer and a smooth, firm top coat of lacquer. Examples of pigments which are difficult to disperse are: anthraquinone, molybdate, iron oxide, and phthalocyanine pigments.

The lacquer according to the invention is used for producing thin protective layers against stone chipping, in particular with a dry film thickness of from 15 to 50 μm. The dry film thickness of the layer obtained is preferably from 20 to 45 μm. The lacquer according to the invention may be applied by the usual methods, e.g. by spraying, airless spraying or electrostatic spraying. The lacquer is subsequently stoved, and this may be carried out at relatively low temperatures. If no additional layer is subsequently to be applied wet in wet, stoving may be carried out at temperatures of about 120° to 180° C., an upper temperature limit below 160° C., preferably below 140° C. and even below 130° C. being generally sufficient. These are extremely low stoving temperatures for layers which are to protect against stone chipping.

The stoving times are below 60 minutes, suitably below 40 minutes, preferably below 30 minutes. For example, stoving may be carried out for 20 to 25 minutes at about 120° C. Such low stoving temperatures are also advantageous when the surface is subsequently to be lacquered with a conventional filler. The fillers known in the art may be stoved at very low temperatures and, as mentioned above, they are advantageously applied wet-in-wet so that the protective layer against stone chipping and the filler can be stoved in a single operation.

EXAMPLE OF PREPARATION A 503 g of a reaction product of 3 mol of hexamethylene diisocyanate and 1 mol of water (Desmodur N, 100%, registered Trade Mark) are dissolved in 218 g of ethyl glycol acetate and reacted at 80° C. with 376 g of ethyl acetoacetate until the isocyanate content of the solution is below 0.1%. 1 g of zinc acetyl acetonate may be added to accelerate masking.

EXAMPLE OF PREPARATION B 1390 g hexanediol-(1,6), 359 g trimethylol propane, 550 g adipic acid, 978 g isophthalic acid and 313 g phthalic acid anhydride are weighed into a reaction vessel equipped with stirrer, separator and column, and condensed by methods known in the art at a temperature of about 200° C. until the residual acid content of the solid resin is below 1 mg KOH per gram of resin (determined according to DIN 53 402). The product is then diluted with 1389 g of ethyl glycol acetate. The solid resin has the following characteristic values:

| aliphatic content | 37.06% by weight |
|---|---|
| ratio of aliphatic to aromatic content | 1.97 |
| hydroxyl content (at AN = 0) | 4.6% by weight |
| hydroxyl functionality (at AN = 0) | 3.0 |

(AN = acid number)

EXAMPLE OF PREPARATION C

A polyester resin is prepared by the method described for example of preparation B, using the following constituents:
891 g hexanediol-(1,6),
810 g trimethylol propane,
1254 g isophthalic acid,
441 g adipic acid,
224 g phthalic acid anhydride.

Condensation is stopped when the residual acid content is 6 mg KOH per gram of resin, after which 1377 g of ethyl glycol acetate are added for dilution. The solid resin has the following characteristic values:

| aliphatic content | 25.03% by weight |
|---|---|
| ratio of aliphatic to aromatic content | 1.17 |
| hydroxyl content (at AN = 6) | 5.0% by weight |
| hydroxyl functionality (at AN = 6) | 5.1 |

EXAMPLE 1

A lacquer used for coatings protecting against stone chipping was prepared from the following components:
30.0 g of polyester containing hydroxyl groups (example of preparation B)
0.5 g finely divided silicon dioxide (Aerosil, registered Trade Mark),
1.0 g carbon black,
4.0 g titanium dioxide (Rutile) (pigment),
29.0 g barium sulphate (filler),
3.0 g butyl acetate,
23.4 g polyisocyanate according to example of preparation A,
5.5 g butyl acetate.

To ensure good levelling flow of the lacquers, all the components with the exception of the last two were first ground in a bead mill at about 60° C. for dispersion of the pigments and fillers in the binder. The ground material was then removed from the mill and the last two components were stirred in at about 40° C. The results obtained are summarised below.

The lacquer formulation from Example 1 was adjusted to a viscosity of 40 s at 20° C. in an AK4 cup by means of a mixture of 2 parts by weight of ethyl glycol acetate and 1 part by weight of a mixture of aromatic hydrocarbons (Solvesso 100, registered Trade Mark). The lacquer was sprayed on electro dip lacquered, phosphated steel sheets and covered wet-in-wet with a commercial filler. The two lacquer layers were hardened together in a circulating air oven, as indicated in Table 1. A commercial top coat lacquer was then sprayed on them and hardened for 15 minutes at 130° C.

| Dry film thicknesses: | electro dip lacquer layer | 20 μm |
|---|---|---|
| | Stone chipping protective layer | 20 μm |
| | filler layer | 20 μm |
| | top coat lacquer layer | 35 μm. |

The stone chipping tests were carried out using a stone chipping test apparatus as specified by VDA (Verband der Automobilindustrie), manufactured by Erichsen, model No. 508.

The test conditions were as follows:

| preliminary tank pressure | 4.5 bar |
| nozzle pressure | 1.0 bar |
| steel scrap | 500 g |
| bombardment time | 5 s |

TABLE 1

| Stoving condition for stone chipping protective/-filler layer "wet in wet" | Assessment according to DIN 53 230 Example 1 |
| --- | --- |
| 20 minutes 125° C. | 1 |
| 20 minutes 140° C. | 1 |

The quantity of lacquer layer chipped off, expressed in code numbers according to DIN 53 230, was assessed.

The stability in storage was determined by viscosity measurements of the lacquers during storage at 32° C. The lacquer formulation according to Example 1 and the corresponding pure binder combination (clear lacquer) were tested.

| | Viscosity | |
| --- | --- | --- |
| | | Example 1 |
| | Example 1 | Clear lacquer |
| | (with pigments) | (without pigments) |
| after days | (mPas/20° C.) | |
| 0 | 390 | 2600 |
| 4 | 390 | 2500 |
| 11 | 390 | 2300 |
| 21 | 390 | 2450 |
| 28 | 390 | 2200 |
| 48 | 395 | 2160 |

Measuring apparatus: Rotovisko RV21 (Haake), measuring head 500

Measuring system: cup, rotary body MV I The viscosities were determined at the following velocity gradients $D(s^{-1})$:

58 $s^{-1}$ for the clear lacquer (without pigments)

115 $s^{-1}$ for the protective layer against stone chipping (with pigments).

EXAMPLE 2

The process was carried out as described in Example 1, using the following components:

24.85 g of hydroxyl-containing polyester (example of preparation C), 1.34 g of levelling agent (Acronal 700L, 10% in xylene, registered Trade Mark)

5.12 g of thixotropic agent (Bentone 38, 10% decomposition, registered Trade Mark)

5.12 g of titanium dioxide (Bayertitan RKB-2, registered Trade Mark)

0.52 g of iron oxide pigment (Bayferrox 303 T, registered Trade Mark)

17.1 g of barium sulphate (Blancfixe N, registered Trade Mark)

0.67 g of finely divided silicon dioxide (Aerosil 200, registered Trade Mark)

20.87 g of polyisocyanate according to example of preparation A.

The mixture obtained after grinding at 60° C. and incorporating the polyisocyanate at about 40° C. was adjusted to a viscosity of 40 s in an AK4 cup (20° C.) with a mixture of 2 parts by weight of ethyl glycol acetate and 1 part by weight of a mixture of aromatic hydrocarbons (Solvesso 100, registered Trade Mark).

The lacquer formulation of Example 2 corresponds to typical filler formulations known in the art as regards the pigments and fillers used and the pigment/binder ratio. The lacquer according to Example 2 therefore forms a protective layer against stone chipping which has filler characteristics and can be sanded down and can be directly covered with top coat lacquer. The lacquer was sprayed on an electro dip lacquered, phosphated steel sheet and cured for 20 minutes at 125° C. (dry film thickness 30 μm). The resulting lacquer layer was tested for its surface hardness by means of an Erichsen pendulum hardness measuring instrument (pendulum hardness according to König) and tested for its suitability for wet sanding with sanding paper of grain 600 (the sanding paper must not get clogged up with wet sanding dust).

| Test | Example 2 |
| --- | --- |
| Stone chipping test (as in Example 1) | 1-2 |
| Suitability for sanding | yes |
| storage stability (determined as in Example 1) | viscosity is constant |
| ability to incorporate pigment at 60-80° C. | unlimited possibility |
| pendulum hardness (according to Konig) | 155 s |

EXAMPLE 3

A lacquer for forming a protective layer against stone chipping was prepared from the following components:

621 g of polyester (as in Example 2)

760 g of titanium dioxide RN 59 (manufactured by Kronos)

40 g of Sicotransrot L 2817 (manufacturers: BASF, registered Trade Mark)

10 g of finely divided silicon dioxide 537 g of polyisocyanate (example of preparation A).

The first four components were dispersed in a laboratory bead mill (manufacturers DRAIS, model PM 1) for 30 minutes at 70° C. together with 1000 g of glass beads (2 mm diameter). The material was then separated from the glass beads, cooled to about 45° C., mixed with the remaining component and adjusted to an AK4 cup outflow time of 40 seconds at 20° C. by means of ethyl glycol acetate.

COMPARISON EXAMPLE

The procedure was the same as in Example 3 but dispersion was carried out at 45° C. To obtain the same intensity of colour as in Example 3, dispersion had to be carried out for more than 60 minutes. The fifth component was then added.

To measure the intensity of colour (DIN 53 238), the lacquers from Example 3 and Comparison Example were applied by spraying to a phosphated steel sheet primed with electro dip lacquer, and then stoved at 130° C. for 20 minutes to form a film which had a thickness when dry of about 40 μm.

We claim:

1. A process of protecting car bodies or car-body parts of motor vehicles against stone chipping with a stone-chipping protective layer comprising coating a motor vehicle car body or car-body part to a dry film thickness of from 15 to 50 μm with a lacquer including pigments, fillers, and binders comprising a mixture of film forming, hydroxyl-containing polyesters and aliphatic and/or cycloaliphatic polyisocyanates which have an average functionality of at least 2.5 and are blocked with aceto-acetic acid alkyl esters in which the alkyl groups are methyl, ethyl, n-propyl, i-propyl, n-butyl, i-butyl or sec.-butyl groups, and organic solvents, said hydroxyl-containing polyesters including branched chain polyesters obtainable from benzene carboxylic acids and aliphatic and/or cycloaliphatic dicarboxylic acids, and aliphatic and/or cycloaliphatic polyols having 2 to 4 hydroxyl groups per molecule, the polyesters having an average hydroxyl functionality of from 2.5 to 6 and hydroxyl content of from 2 to 6% by weight and comprising from 15 to 50% by weight of aliphatic content, namely, the weight of aliphatic groups containing at least 4 to 20 carbon atoms in an unbranched chain plus any alkyl groups directly attached to said chain, the ratio by weight of the aliphatic content present in the polyester to the weight of the benzene rings in the polyester, calculated as sum of the weight of carbon atoms of the benzene rings and of the hydrogen atoms attached to these carbon atoms being in the range of from 1:1 to 2.5:1.

2. The process of claim 1 wherein the lacquer used to coat the car body or car-body part of the motor vehicle includes from 0.8 to 1.3 equivalents of blocked isocyanate groups in the isocyanate component per equivalent of hydroxyl groups in the polyester component.

3. The process of claim 1 wherein the lacquer used to coat the car body or car-body part of the motor vehicle includes colored pigments for producing a yellow, red, green or blue color shade corresponding to the color shade of the desired top-coat lacquer.

4. The process of claim 1 further comprising (a) overlacquering the lacquer wet-in-wet with filler and (b) stoving the lacquer together with the filler.

5. Process of claim 1 wherein the lacquer for forming the layer protecting against stone chipping contains colored pigments and is directly lacquered with a colored top-coat lacquer.

6. Process of claim 1 further comprising stoving the coated car body or car-body part of the motor vehicle.

7. Process according to claim 1 wherein the carboxylic acids from which the branched chain polyesters are obtainable include monocarboxylic acids.

8. Motor vehicle car body or car-body part coated in accordance with claim 1.

9. Motor vehicle car body or car-body part coated in accordance with claim 2.

10. Motor vehicle car body or car-body part coated in accordance with claim 3.

11. Motor vehicle car body or car-body part protected against stone chipping in accordance with claim 4.

12. Motor vehicle car body or car-body part protected in accordance with claim 5.

13. Motor vehicle car body or car-body part protected against stone chipping in accordance with claim 6.

14. Motor vehicle car body or car-body part protected in accordance with claim 7.

* * * * *